United States Patent
Okuto

(10) Patent No.: US 8,030,898 B2
(45) Date of Patent: Oct. 4, 2011

(54) ALARM-INCLUDING PROTECTION APPARATUS FOR LITHIUM-ION BATTERY AND METHOD THEREOF

(75) Inventor: Tadashi Okuto, Longtan Township, Taoyuan County (TW)

(73) Assignees: Celxpert Energy Corporation, Taoyuan County (TW); Advance Smart Industrial Limited, Tortola (VG)

( * ) Notice: Subject to any disclaimer, the term of this patent is extended or adjusted under 35 U.S.C. 154(b) by 493 days.

(21) Appl. No.: 12/155,859

(22) Filed: Jun. 11, 2008

(65) Prior Publication Data
US 2009/0128094 A1   May 21, 2009

(30) Foreign Application Priority Data
Nov. 16, 2007  (TW) ............................. 96143430 A

(51) Int. Cl.
*H02J 7/00* (2006.01)
*H02J 7/06* (2006.01)

(52) U.S. Cl. ....................................... 320/134; 320/164
(58) Field of Classification Search .................. 320/134, 320/164
See application file for complete search history.

(56) References Cited

U.S. PATENT DOCUMENTS

| | | | |
|---|---|---|---|
| 5,780,991 A | 7/1998 | Brake et al. | |
| 5,869,949 A | 2/1999 | Nishikawa et al. | |
| 6,172,482 B1 * | 1/2001 | Eguchi | 320/134 |
| 6,313,611 B1 * | 11/2001 | Mowry et al. | 320/136 |
| 6,437,540 B2 | 8/2002 | Sonobe | |
| 6,511,764 B1 | 1/2003 | Marten | |
| 6,518,725 B2 | 2/2003 | Marten | |
| 6,586,910 B2 * | 7/2003 | Matsui et al. | 320/122 |
| 7,400,113 B2 | 7/2008 | Osborne | |
| 7,489,106 B1 | 2/2009 | Tikhonov | |
| 2002/0190692 A1 | 12/2002 | Marten | |
| 2007/0285062 A1 * | 12/2007 | Cherng et al. | 320/136 |
| 2008/0111520 A1 * | 5/2008 | Sasaki | 320/134 |

FOREIGN PATENT DOCUMENTS

| | | |
|---|---|---|
| JP | 9-084275 A | 3/1997 |
| JP | 2001-095170 A | 4/2001 |
| JP | 2007-335337 A | 12/2007 |
| JP | 2008-067486 A | 3/2008 |
| WO | 2008137764 A1 | 11/2008 |
| WO | 2010117498 A2 | 10/2010 |

* cited by examiner

*Primary Examiner* — M'Baye Diao
(74) *Attorney, Agent, or Firm* — Rosenberg, Klein & Lee

(57) ABSTRACT

An alarm-including protection apparatus and method thereof are used to protect a lithium-ion battery with a plurality of series cells. The protection apparatus includes a voltage balance controller for detecting the terminal voltage of each cell and correcting the terminal voltage of each cell. A protection unit and the lithium-ion battery are connected in series. A microprocessor connects to the voltage balance controller and the protection unit for receiving the terminal voltage of each cell and figuring out a voltage difference between the maximum terminal voltage and the minimum terminal voltage of the series cells. According to the comparison result of the voltage difference and a plurality of critical voltage differences, the microprocessor is used to correct the terminal voltage of each cell, generate an alarm signal or stop charging to the lithium-ion battery.

19 Claims, 4 Drawing Sheets

ALARM-INCLUDING PROTECTION APPARATUS FOR LITHIUM-ION BATTERY AND METHOD THEREOF

BACKGROUND OF THE INVENTION

1. Field of the Invention

The present invention relates to a lithium-ion battery alarm-including protection apparatus and method thereof; in particular, relates to apparatus and method of providing lithium-ion battery alarm protection by means of joint operations of hardware circuit and software program.

2. Description of the Related Art

Due to the restrictions on material features, the charging voltage for a lithium-ion battery generally should not exceed 4.2V/cell, as the life thereof would be significantly reduced otherwise. Another risk of applying an excessive charging voltage to a lithium-ion battery is that it puts the battery at risk of burning or explosion. Another restriction on lithium-ion batteries is that when discharging, the voltage should not drop below 2.7V/cell, as the battery may not be rechargeable otherwise.

Therefore, in the prior art a protection apparatus would be installed onto a lithium-ion battery in its application device in order to provide lithium-ion battery protection. Please refer to FIG. 1, which illustrates a circuit block diagram of a conventional protection apparatus. The conventional protection apparatus 1 consists of a heat-sensitive unit 10, a heat-melted fuse 11, a charging control switch 12, a discharging control switch 13, a short circuit protector 14 and a central microprocessor 15. Herein, the heat-sensitive unit 10 is used to detect any abnormal temperature generated during the charging/discharging of the lithium-ion battery 2. The heat-melted fuse 11 is to break while overheated, preventing possible damage to the lithium-ion battery 2 caused by high temperature. The central microprocessor 15 controls the charging control switch 12 and the discharging control switch 13, for performing charging or discharging on the lithium-ion battery 2. The short circuit protector 14 can provide circuit protection while short circuit exists.

In conjunction with FIG. 1, now refer to FIG. 2, in which illustrates a diagram of charging voltage distribution for a conventional lithium-ion battery. When the charger 5a charges on the lithium-ion battery 2, each cell 21, 22, 23 therein will be affected by different internal resistances during the charging process, causing the phenomenon of inconsistent terminal voltage distribution on each cell 21, 22, 23. At this moment, the conventional protection apparatus 1 will protect the cell first reaching the upper voltage limit, further stopping charging the entire lithium-ion battery 2, thus leaving the other cells which have not yet reached the upper voltage limit not fully charged. As shown in FIG. 2, the voltage in cell 21 is 4.35V, the voltage in cell 22 is 4.15V and the voltage in cell 23 is 4.1V, while the charging voltage offered by the charger 5a is 12.6V.

Besides, in case of discharging, the lithium-ion battery 2 will behave merely contrarily to charging, wherein the conventional protection apparatus 1 will protect the cell first reaching the lower voltage limit, further stopping discharging the entire lithium-ion battery 2, thus leaving the other cells which have not yet reached the lower voltage limit not fully discharged.

As a result, when using the conventional protection apparatus 1 to protect the lithium-ion battery 2, it would generate in a cyclic way an accumulated interference effect, hence while charging the lithium-ion battery 2, the situation of overly high charging voltage might occur in certain cells, causing burning or explosion; alternatively, during discharging, the situation of overly low discharging voltage might exist in certain cells, resulting in being unable to restore its capacity and to perform recharging.

SUMMARY OF THE INVENTION

In view of the above-mentioned problems, the present invention provides a lithium-ion battery alarm-including protection apparatus and method thereof, which utilizes the joint operations of hardware circuit and software program to avoid occurrences of damages to lithium-ion battery, such as burning and explosion, caused by accumulated interference effect during charging.

The lithium-ion battery of the present invention applies to a lithium-ion battery consisting of a series of cells serially connected, which includes a voltage balance controller, a protection unit and a microprocessor. Herein the voltage balance controller connects the lithium-ion battery in order to detect the terminal voltage of each cell, and balance the terminal voltage of each cell. The protection unit serially connects to the lithium-ion battery. The microprocessor connects to the voltage balance controller and the protection unit, which receives the terminal voltage of each cell and figuring out a charging voltage difference between the maximum terminal voltage and the minimum terminal voltage of the series cells. Meanwhile, according to the comparison result of the charging voltage difference and a plurality of critical voltage differences, the microprocessor is used to control the operations of the voltage balance controller, generate an alarm signal or control the actions of the protection unit.

The lithium-ion battery alarm-including protection method of the present invention applies to a lithium-ion battery consisting of a series of cells serially connected, which includes: (a) initially, in the lithium-ion battery, determining whether the charging voltage difference between the maximum terminal voltage and the minimum terminal voltage of the cell is greater than a first critical voltage difference; if yes, performing balance correction on the cell terminal voltage; otherwise, maintaining normal charging on lithium-ion battery. Next, (b) after the balance correction on cell terminal voltage, determining again, in the lithium-ion battery, whether the charging voltage difference between the maximum terminal voltage and the minimum terminal voltage of the cell is greater than a second critical voltage difference; if yes, providing an alarm signal output; otherwise, performing balance correction on the cell terminal voltage. Finally, (c) determining, in the lithium-ion battery, whether the charging voltage difference between the maximum terminal voltage and the minimum terminal voltage of the cell is greater than a third critical voltage difference; if yes, breaking the charging circuit of the lithium-ion battery; otherwise, returning to step (a).

The lithium-ion battery alarm-including protection apparatus and method thereof offered by the present invention utilizes a microprocessor to receive the terminal voltage of any cell, and figures out the maximum voltage and minimum voltage of a charging voltage difference. Furthermore, the microprocessor controls the actions of the voltage balance controller based on charging voltage difference, in order to correct the terminal voltage of each cell, generate an alarm signal, or control protection unit to break the charging circuit of lithium-ion battery. Hence, the present invention can avoid the occurrences of damages, e.g. burning or explosion etc., of lithium-ion battery caused by accumulated interference effect during charging.

The above-mentioned as well as the following descriptions are merely exemplary, with a view to further illustrate the claimed scope of the present invention. Other objectives and advantages of the present invention will be set out and explained in the following descriptions and drawings.

DETAILED DESCRIPTION OF THE PREFERRED EMBODIMENT

Figure 1:
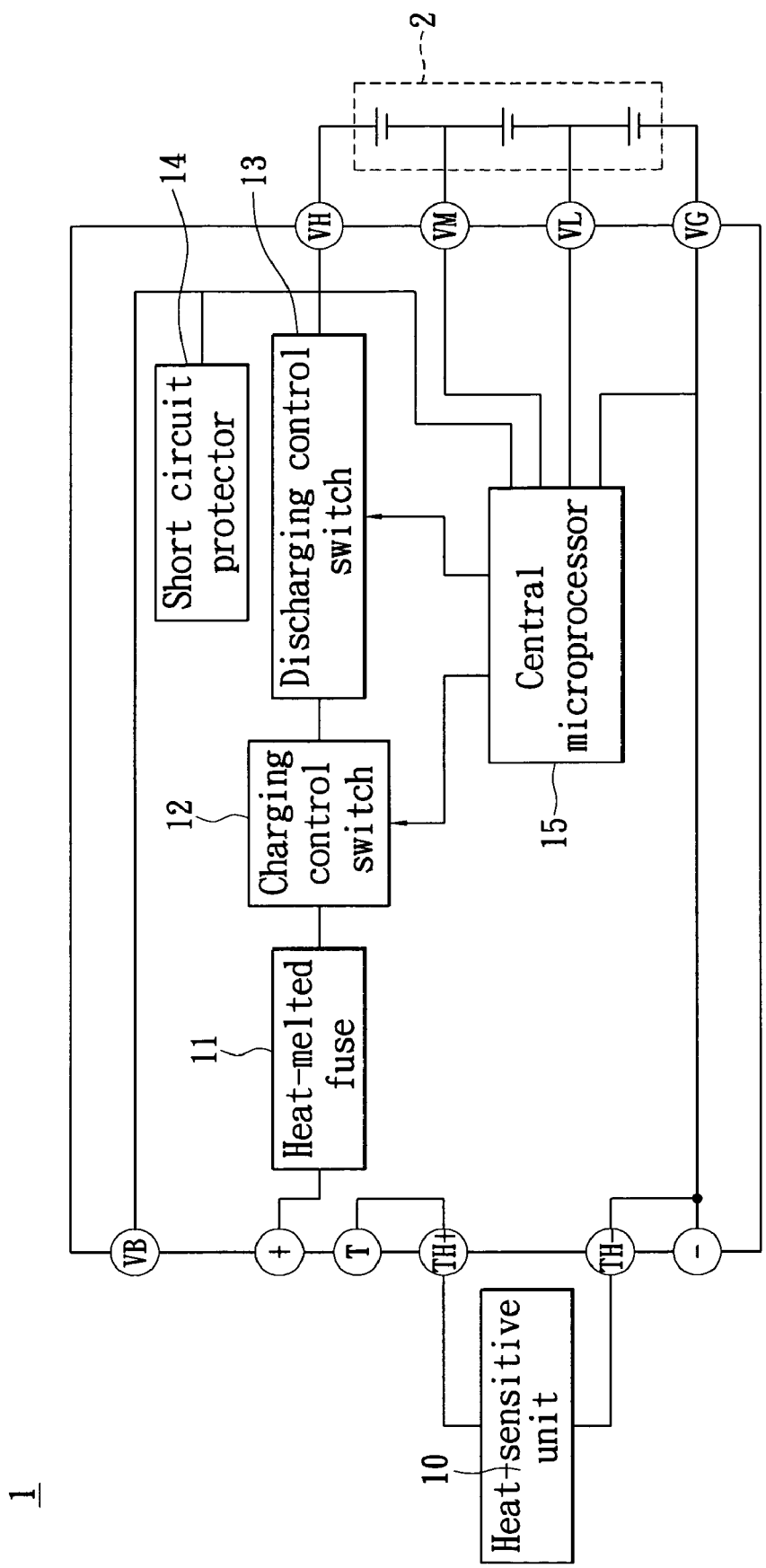
FIG. 1 illustrates a circuit block diagram of a conventional protection apparatus.
Figure 2:
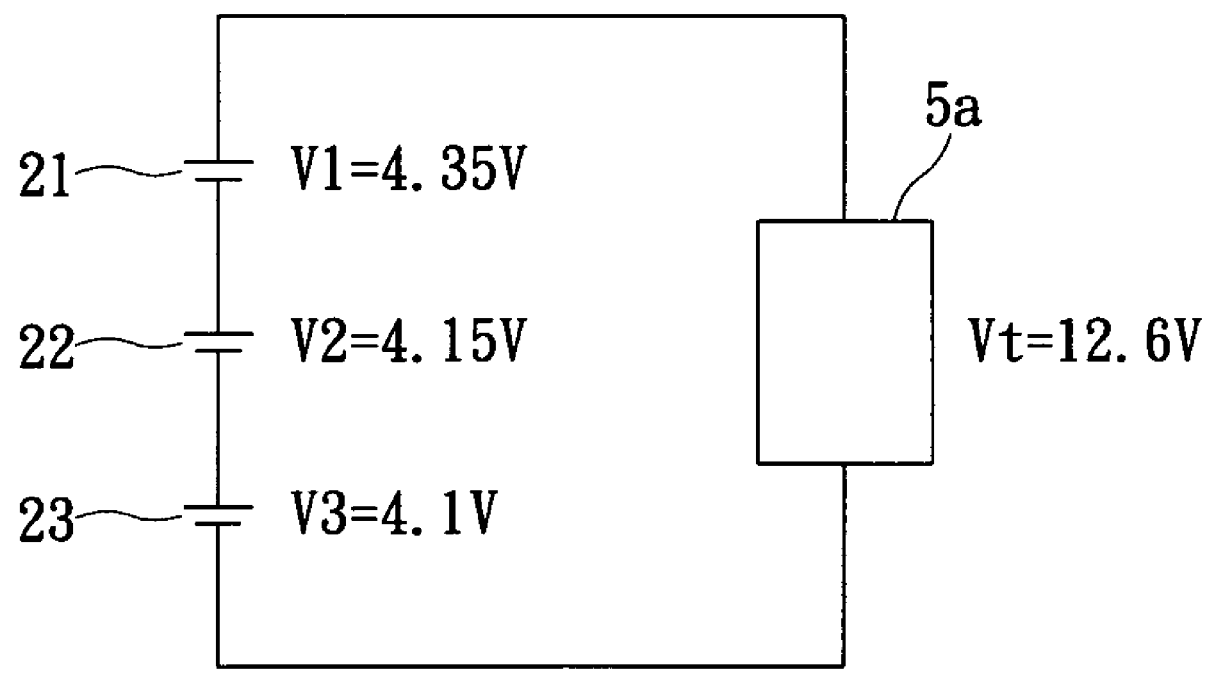
FIG. 2 illustrates a charging voltage distribution diagram.
Figure 3:
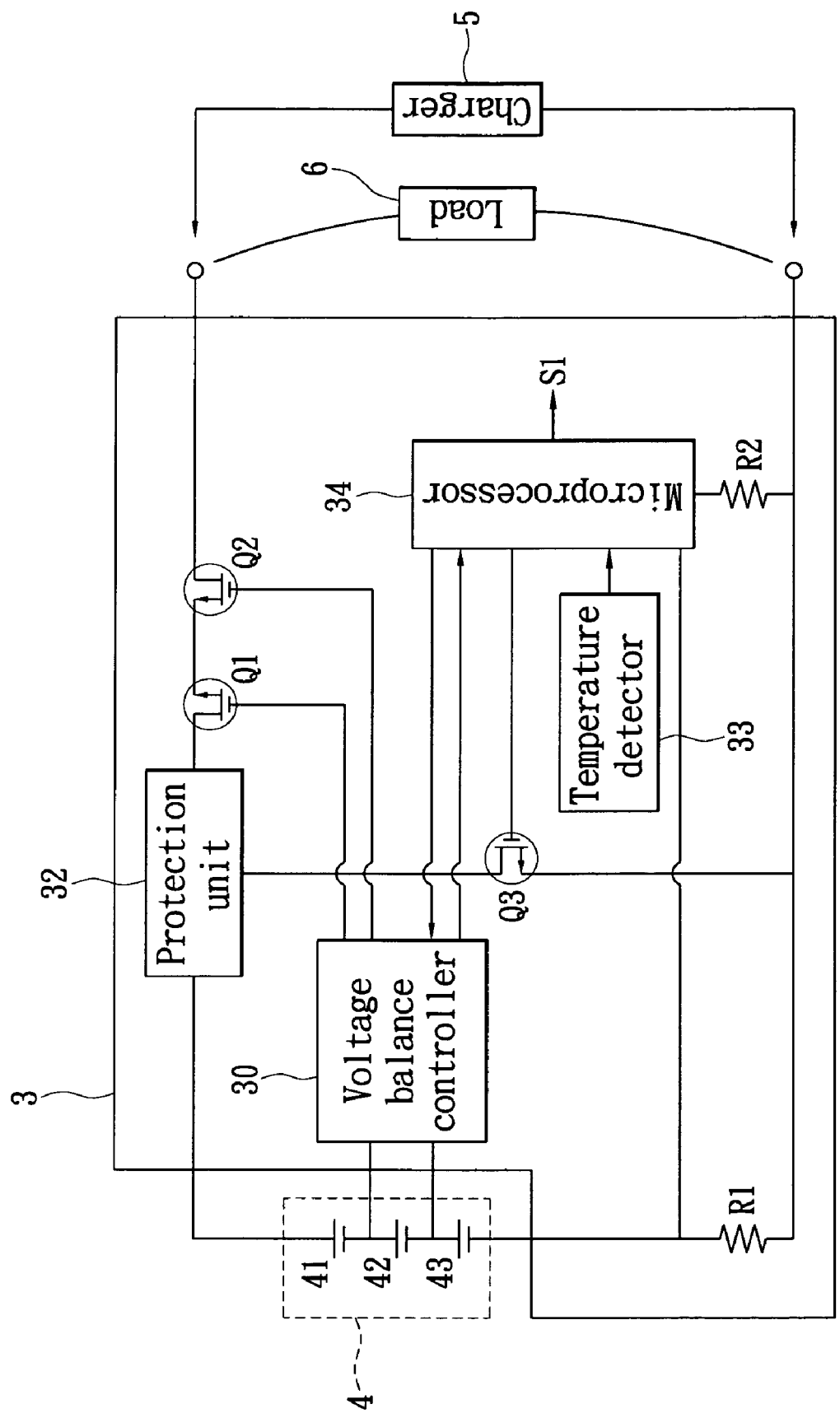
FIG. 3 illustrates a circuit block diagram of lithium-ion battery alarm-including protection apparatus of the present invention.

Referring to FIG. 3, which illustrates a circuit block diagram of lithium-ion battery alarm-including protection apparatus of the present invention. The lithium-ion battery alarm-including protection apparatus 3 applies to a lithium-ion battery 4 containing several cells 41, 42, 43 serially connected together. Herein the lithium-ion battery alarm-including protection apparatus 3 consists of a voltage balance controller 30, a protection unit 32, an over-charging protection switch Q1, an over-discharging protection switch Q2, a protection switch Q3 and microprocessor 34.

The protection unit 32, the over-charging protection switch Q1, the over-discharging protection switch Q2 and the lithium-ion battery 4 form a serial connection, and under normal usage, the charger 5 charges on the lithium-ion battery 4 via the protection unit 32, the over-charging protection switch Q1 and the over-discharging protection switch Q2; besides, the lithium-ion battery 4 also discharges on the load 6 via the protection unit 32, the over-charging protection switch Q1 and the over-discharging protection switch Q2. Meanwhile, the over-charging protection switch Q1 will enter into a turn-off status in case the lithium-ion battery 4 becomes over charged, in order to meet the requirement of the lithium-ion battery 4 over-charge protection; also, the over-discharging protection switch Q2 will enter into a turn-off status in case the lithium-ion battery 4 becomes over discharged, in order to meet the requirement of the lithium-ion battery 4 over-discharge protection.

Referring again to FIG. 3, the voltage balance controller 30 connect the lithium-ion battery 4, the over-charging protection switch Q1 and the over-discharging protection switch Q2, wherein the voltage balance controller 30 dynamically detects the terminal voltage on each cell 41, 42, 43, as well as controls the terminal voltage balance of each cell 41, 42, 43. When terminal voltage on one of the cells 41, 42, 43 becomes excessively high, the voltage balance controller 30 drives the over-charging protection switch Q1 to enter into a turn-off status, meeting the requirement of the lithium-ion battery 4 over-charge protection. Furthermore, when terminal voltage on one of the cells 41, 42, 43 becomes excessively low, the voltage balance controller 30 drives the over-discharging protection switch Q2 to enter into a turn-off status, meeting the requirement of the lithium-ion battery 4 over-discharge protection.

Referring again to FIG. 3, the microprocessor 34 connects to the voltage balance controller 30 and the protection switch Q3; meanwhile, the microprocessor 34 is preset with a first critical voltage difference Vth1, a second critical voltage difference Vth2, a third critical voltage difference Vth3 and a critical voltage Vth. the microprocessor 34 dynamically receives the terminal voltage of each cell 41, 42, 43 from the voltage balance controller 30, and determines whether the terminal voltage of each cell 41, 42, 43 exceeds the preset critical voltage Vth. If no, then the cells 41, 42, 43 continue to be charged by the charger 5. However, in case the terminal voltage on any one of the cells 41, 42, 43 indeed exceeds the preset critical voltage Vth, then the microprocessor 34 starts to calculate a charging voltage difference $\Delta V$ between the maximum terminal voltage Vmax and the minimum terminal voltage Vmin of the cells 41, 42, 43.

Referring again to FIG. 3, after the microprocessor 34 figures out the charging voltage difference $\Delta V$, it compares the charging voltage difference $\Delta V$ with the first critical voltage difference Vth1; based on the comparison result, if the charging voltage difference $\Delta V$ is smaller than the first critical voltage difference Vth1, then charge the lithium-ion battery 4 normally. On the contrary, regarding to the comparison result, if the charging voltage difference $\Delta V$ is bigger than the first critical voltage difference Vth1, then the microprocessor 34 controls the actions of the voltage balance controller 30, in order to correct the terminal voltages on each cells 41, 42, 43, allowing to meet the balance requirement.

After the above-mentioned actions of the voltage balance controller 30, the microprocessor 34 will again dynamically receive the terminal voltage of each cell 41, 42, 43 and calculates the charging voltage difference $\Delta V$, then compares the charging voltage difference $\Delta V$ with the second critical voltage difference Vth2; based on the comparison result, if the charging voltage difference $\Delta V$ is smaller than the second critical voltage difference Vth2, then the microprocessor 34 again controls the actions of the voltage balance controller 30, so as to correct the terminal voltage on each cells 41, 42, 43, allowing to meet the balance requirement. On the other hand, regarding to the comparison result, if the charging voltage difference $\Delta V$ is bigger than the second critical voltage difference Vth2, then the microprocessor 34 sends an alarm signal to warn the user that the lithium-ion battery 4 is now under the situation of imminent danger.

At the same moment as the microprocessor 34 sends an alarm signal S1, the microprocessor 34 again dynamically receives the terminal voltage of each cell 41, 42, 43 and calculates the charging voltage difference $\Delta V$, then compares the calculated charging voltage difference $\Delta V$ with the third critical voltage difference Vth3; based on the comparison result, if the charging voltage difference $\Delta V$ is smaller than the third critical voltage difference Vth3, then the microprocessor 34 compares again the charging voltage difference $\Delta V$ with the first critical voltage difference Vth1. On the contrary, for the comparison result, suppose the charging voltage difference $\Delta V$ is bigger than the third critical voltage difference Vth3, then the microprocessor 34 controls the turn-on of the protection switch Q3, with a view to burn off the protection unit 32 for protecting the lithium-ion battery 4, wherein such a protection unit 32 can be a fuse.

Referring again to FIG. 3, the lithium-ion battery alarm-including protection apparatus 3 further contains a temperature detector 33, in which the temperature detector 33 is connected to the microprocessor 34, and placed within the surroundings of the lithium-ion battery 4 for inspecting the ambient temperature of the lithium-ion battery 4, then sending the temperature data to the microprocessor 34, in order that the microprocessor 34 provides protection against abnormal temperature occurred in the lithium-ion battery 4. Additionally, the lithium-ion battery alarm-including protection apparatus 3 further includes a resistor R2, in which the resistor R2 is connected to the microprocessor 34. According to the variations from different cell vendors, the resistor R2 provides adjustments to the first critical voltage difference Vth1, the second critical voltage difference Vth2 and the third critical voltage difference Vth3. Besides, The lithium-ion battery alarm-including protection apparatus 3 further includes a load detected resistor R1, wherein the load detected resistor R1 is serially connected to the lithium-ion battery 4, detecting the magnitude of the current flowing through the lithium-ion battery 4 and sending the detected result to the microprocessor 34, thus enabling the microprocessor 34 to provide the lithium-ion battery 4 with protection against over-current.

Referring again to FIG. 3, the microprocessor 34 in the lithium-ion battery alarm-including protection apparatus 3 acquires the terminal voltage of each cell 41, 42, 43 in the lithium-ion battery 4 via the voltage balance controller 30, and upon the terminal voltage in each cell 41, 42, 43 exceeds the critical voltage Vth, it starts the protection operations of the lithium-ion battery 4. In such protection operations, the microprocessor 34 figures out the charging voltage difference ΔV between the maximum terminal voltage Vmax and the minimum terminal voltage Vmin for each cell 41, 42, 43, then sequentially compares the charging voltage difference ΔV with the first critical voltage difference Vth1, the second critical voltage difference Vth2 and the third critical voltage difference Vth3. Herein, when charging voltage difference ΔV is bigger than the first critical voltage difference Vth1, the microprocessor 34 controls the actions of the voltage balance controller 30, in order to correct the terminal voltage of each cell 41,42, 43. After such a correction, suppose the charging voltage difference ΔV is bigger than the second critical voltage difference Vth2, then the microprocessor 34 provides an alarm signal S1 to a host computer (not shown). At the same time, in case the charging voltage difference ΔV is bigger than the third critical voltage difference Vth3, the microprocessor 34 breaks the charging circuit of the lithium-ion battery 4, so as to allow for its protection.

Figure 4:
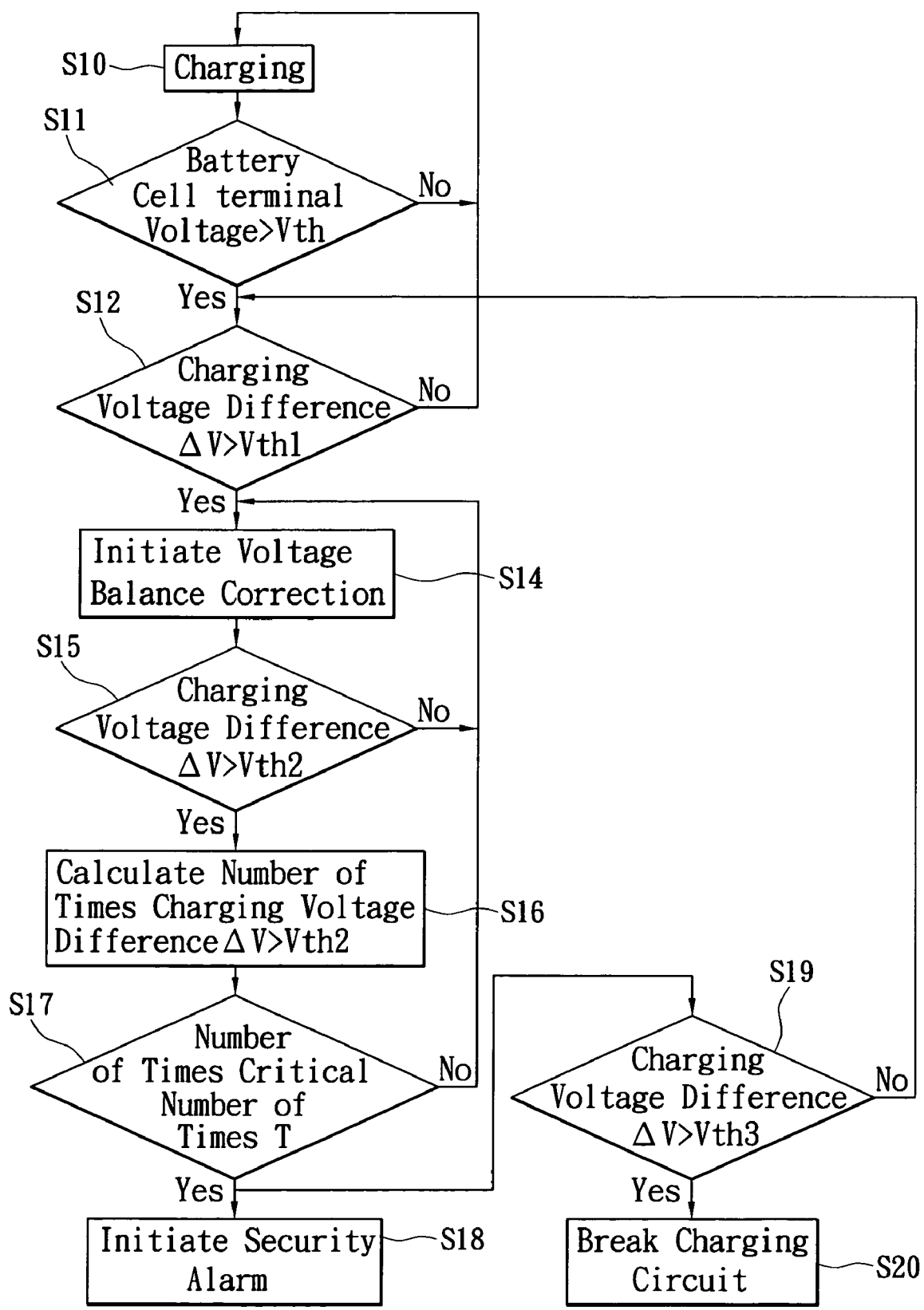
FIG. 4 illustrates an operational flowchart of the present invention.

In conjunction with FIG. 3, refer now to FIG. 4, in which illustrates an operational flowchart of the present invention. As shown in FIG. 4, the operational flow starts at normal charging status (S10), while the cells 41, 42, 43 in the lithium-ion battery 4 begin to build voltage. Then, determine the magnitude of terminal voltage on cell 41, 42, 43 (S11), at this moment, if the terminal voltage is smaller than the critical voltage Vth, then cells 41, 42, 42 continue their normal charging to build voltage; contrarily, suppose terminal voltage of any one of the cells becomes bigger than the critical voltage Vth, then initiates the lithium-ion battery protection method of the present invention.

First of all, determine, in the lithium-ion battery 4, whether the charging voltage difference ΔV between the maximum terminal voltage Vmax and the minimum terminal voltage Vmin of the cell is bigger than the first critical voltage difference Vth1 (S12), and if the charging voltage difference ΔV is bigger than the first critical voltage difference Vth1, then performs terminal voltage correction on each cell 41, 42, 43 (S14); in case no, then the lithium-ion battery 4 continues normal charging action (S10). Next, determine, in the lithium-ion battery 4, whether the charging voltage difference ΔV between the maximum terminal voltage Vmax and the minimum terminal voltage Vmin of the cell is bigger than the second critical voltage difference Vth2, and if the charging voltage difference ΔV is bigger than the second critical voltage difference Vth2, then activates a security alarm (S18); however, if not, performs terminal voltage correction on each cell 41, 42, 43 (S14).

Before the step of activating a security alarm (S18), it will calculate beforehand the times of the charging voltage difference ΔV being bigger than the second critical voltage difference Vth2 (S16). Next, determine whether this number of times exceeds a critical number of times T (S17), in which suppose this number of times does not exceed the critical number of times T, then perform terminal voltage correction on each cell 41, 42, 43 (S14); whereas if this number of times does exceed the critical number of times T, then a security alarm will be activated (S18).

Meanwhile, after step (S17), to determine, in the lithium-ion battery 4, whether the charging voltage difference ΔV between the maximum terminal voltage Vmax and the minimum terminal voltage Vmin of the cell is bigger than the third critical voltage difference Vth3. If the charging voltage difference ΔV is bigger than the third critical voltage difference Vth3, then breaks the charging circuit of the lithium-ion battery 4 (S20), thereby protecting it. Otherwise, if not so, then return to step (S12), where determines again whether the charging voltage difference ΔV is bigger than the first critical voltage difference Vth1.

In summary, the lithium-ion battery alarm-including protection apparatus and method of the present invention uses a microprocessor to receive terminal voltage of each cell, and calculates the charging voltage difference ΔV between the maximum terminal voltage Vmax and the minimum terminal voltage Vmin in the cell. Furthermore, the microprocessor, based on the comparison result between the charging voltage difference and the internal critical voltage difference, corrects the terminal voltage of cell, or generates alarm signal, or else breaks the charging circuit of the lithium-ion battery. Thus, the present invention can avoid occurrences of damages to lithium-ion battery, such as burning and explosion, caused by accumulated interference effect during charging.

As noted herein, the above-mentioned descriptions are merely the preferred embodiments of the present invention, whereas the characters of the present invention are not limited thereto. Any skilled persons of the art within the field of the present invention can easily recognize and consider changes, substitutions and modifications thereof, without departing from the scope of the present invention defined in the following claims.

What is claimed is:

1. A lithium-ion battery alarm-including protection apparatus, applicable to a lithium-ion battery containing several serially connected cells, including:
    a voltage balance controller, connected to the lithium-ion battery, the voltage balance controller being used to detect the terminal voltage of each cell, and to balance the terminal voltage of each cell;
    a protection unit, serially connected to the lithium-ion battery; and
    a microprocessor, connected to the voltage balance controller and the protection unit, the microprocessor receiving the terminal voltage of each cell, and calculating a charging voltage difference between the maximum terminal voltage and the minimum terminal voltage of the cell, the microprocessor further controlling the actions of the voltage balance controller based on the comparison result between the charging voltage difference and a plurality of critical voltage differences, and generating an alarm signal or controlling the actions of the protection unit.

2. The lithium-ion battery alarm-including protection apparatus as in claim 1, further including a protection switch, the protection switch being connected to the microprocessor and the protection unit, wherein the microprocessor controls the protection switch to drive the actions of the protection unit.

3. The lithium-ion battery alarm-including protection apparatus as in claim 2, wherein the protection unit is a fuse.

4. The lithium-ion battery alarm-including protection apparatus as in claim 2, further including an over-charging protection switch, the over-charging protection switch being serially connected to the lithium-ion battery, and controlled by the voltage balance controller, in order to protect the lithium-ion battery against over-charging.

5. The lithium-ion battery alarm-including protection apparatus as in claim 4, further including an over-discharging protection switch, the over-discharging protection switch being serially connected to the lithium-ion battery and controlled by the voltage balance controller in order to protect the lithium-ion battery against over-discharging.

6. The lithium-ion battery alarm-including protection apparatus as in claim 2, wherein the plurality of critical voltage differences includes a first critical voltage difference, a second critical voltage difference and a third critical voltage difference.

7. The lithium-ion battery alarm-including protection apparatus as in claim 6, wherein, when the voltage difference is bigger than the first critical voltage difference, the microprocessor controls the actions of the voltage balance controller in order to balance the terminal voltage of each cell.

8. The lithium-ion battery alarm-including protection apparatus as in claim 6, wherein, when the voltage difference is bigger than the second critical voltage difference, the microprocessor outputs the alarm signal.

9. The lithium-ion battery alarm-including protection apparatus as in claim 6, wherein, when the voltage difference is bigger than the third critical voltage difference, the microprocessor controls the actions of the protection unit.

10. The lithium-ion battery alarm-including protection apparatus as in claim 2, wherein, through a temperature detector, the microprocessor is used to detect the ambient temperature of the lithium-ion battery, and to protect the lithium-ion battery against abnormal temperature.

11. The lithium-ion battery alarm-including protection apparatus as in claim 6, further including a resistor, the resistor being connected to the microprocessor, allowing the adjustment to the first critical voltage difference, the second critical voltage difference and the third critical voltage difference.

12. The lithium-ion battery alarm-including protection apparatus as in claim 6, wherein, through a load detected resistor, the microprocessor detects the current inside the lithium-ion battery, and protects the lithium-ion battery against over-current.

13. A lithium-ion battery alarm-including protection method, applicable to a lithium-ion battery containing several serially connected cells, including:
   (a) determining, in the lithium-ion battery, whether the charging voltage difference between the maximum terminal voltage and the minimum terminal voltage of the cell is greater than a first critical voltage difference; if yes, performing balance correction of terminal voltage on each cell;
   (b) determining, in the lithium-ion battery, whether the charging voltage difference between the maximum terminal voltage and the minimum terminal voltage of the cell is greater than a second critical voltage difference; if yes, providing an alarm signal; and
   (c) determining, in the lithium-ion battery, whether the charging voltage difference between the maximum terminal voltage and the minimum terminal voltage of the cell is greater than a third critical voltage difference; if yes, breaking the charging circuit of the lithium-ion battery.

14. The lithium-ion battery alarm-including protection method as in claim 13, wherein, before step (a), further including the step of determining whether the terminal voltage of each cell exceeds a critical voltage, in which, if found not to exceed, then charge each cell, if found exceeding, then perform step (a).

15. The lithium-ion battery alarm-including protection method as in claim 14, wherein, in step (a), if the charging voltage difference is not bigger than the first critical voltage difference, then maintain the charging action on each cell.

16. The lithium-ion battery alarm-including protection method as in claim 14, wherein in step (b), the correction of the terminal voltage on each cell continues if the charging voltage difference is not bigger than the second critical voltage difference.

17. The lithium-ion battery alarm-including protection method as in claim 14, after step (a) further including counting the number of times the charging voltage difference is bigger than the second critical voltage difference.

18. The lithium-ion battery alarm-including protection method as in claim 17, further including, after the step of counting the number of times the charging voltage difference is bigger than the second critical voltage difference, a step of determining whether the number times exceeds a critical number of times, whereby, if not exceeded, the correction of the terminal voltage on each cell is performed, and if exceeded, a security alarm is activated.

19. The lithium-ion battery alarm-including protection method as in claim 14, wherein in step (c), step (a) is performed if the charging voltage difference is not bigger than the third critical voltage difference.

* * * * *